United States Patent [19]
Bergmann

[11] Patent Number: 5,516,215
[45] Date of Patent: May 14, 1996

[54] ROLLER-BEARING CAGE

[75] Inventor: Klaus Bergmann, Hambach, Germany

[73] Assignee: FAG Kugelfischer Georg Schafer AG, Germany

[21] Appl. No.: 436,022

[22] Filed: May 5, 1995

[30] Foreign Application Priority Data

Jun. 18, 1994 [DE] Germany ............... 94 09 897.2 U

[51] Int. Cl.$^6$ .................................................. F16C 33/46
[52] U.S. Cl. ........................... 384/560; 384/448; 384/572
[58] Field of Search ................................ 384/560, 448, 384/572, 576, 574, 580

[56]     References Cited

U.S. PATENT DOCUMENTS

| | | | |
|---|---|---|---|
| 4,684,268 | 8/1987 | Sahlgren et al. | 384/574 |
| 4,699,529 | 10/1987 | Scholl et al. | 384/572 |
| 4,812,058 | 3/1989 | Hofmann et al. | 384/572 |
| 5,051,006 | 9/1991 | Van Voorthuijsen | 384/574 |

*Primary Examiner*—Lenard A. Footland
*Attorney, Agent, or Firm*—Ostrolenk, Faber, Gerb & Soffen

[57]     ABSTRACT

A roller-bearing cage prevents bearing rollers from falling out of the cage when the outer ring of the bearing is away from the cage, for example, when the outer ring is removed, the cage is removed or the cage is swung out from the outer ring. The rollers are held in place by holding knobs formed on a radially outwardly directed cage flange located at the axial end of the rollers. The knobs are located radially outwardly of the pitch circle of the rollers, are spaced circumferentially apart sufficient to be out of contact with the rollers when the rollers are in the operating position of the bearing in contact with the outer and inner ring, yet are spaced close enough together that the space between two holding knobs is less than the diameter of the roller lying opposite the knobs. The knobs are formed on a resilient, outwardly directed cage flange which moves resiliently upon the snapping in and out of the rollers in the cage. The knobs may be hemispherical or frustoconically shaped.

9 Claims, 2 Drawing Sheets

1

ROLLER-BEARING CAGE

BACKGROUND OF THE INVENTION

The present invention relates to a roller-bearing cage and particularly to shaping of the cage to retain the rollers in the cage.

It is desirable that the rollers of a roller bearing remain in the cage even when the outer ring of the bearing is removed or the cage for the set of rollers of the bearing is swung out.

For this purpose, Federal Republic of Germany Utility Model 1 863 056 discloses mushroom head rivets which are arranged between rollers and on the radially directed flange of the cage outside the pitch circle of the row of rollers. These holding means are applied after assembly of the bearing, are cumbersome, difficult and thus expensive, and have the disadvantage that subsequent dismantling or verification of the bearing is possible only upon destruction of the mushroom rivets.

European Unexamined Application for Patent 0 374 111 discloses providing the radial edge of the cage with indentations which are directed toward the pockets of the cage and which engage into recesses provided in the end of the rollers to prevent the rollers from falling out of the cage. The requirement for a recess in the roller is a disadvantage, as it not only constitutes an additional expense in manufacture of the bearing but it may also lead to disturbances since dirt or other foreign substances may deposit in the recesses.

SUMMARY OF THE INVENTION

The object of the present invention is to develop a roller bearing cage so that dependable, inexpensive holding of the rollers is obtained by simple means.

A roller bearing cage according to the invention prevents bearing rollers from falling out of the cage when the outer ring of the bearing is away from the cage, for example when the outer ring is removed, the cage is removed or the cage is swung out from the outer ring. The rollers are held in place by holding knobs formed on a radially outwardly directed portion of the cage which is located at an axial end of the cage at the axial end of the rollers. The knobs are located radially outwardly of the pitch circle of the rollers, and are spaced circumferentially apart sufficiently to be out of contact with the rollers when the rollers are in the operating position of the bearing in contact with the outer and inner ring, yet are spaced close enough together that the space between two holding knobs is less than the diameter of the roller lying opposite the knobs. The knobs are formed on a preferably resilient, radially outwardly directed cage flange which shifts resiliently upon the snapping in and out of the rollers in the cage. The knobs may be hemispherical or frustoconically shaped. The cage may contain a radially inward directed part at the opposite end of the rollers from the radially outwardly directed part.

By arranging of the holding knobs on the radial flange of the cage, the rollers can easily be snapped in and out of the cage and can be reliably secured against falling out when the outer ring of the bearing is removed or when, in the case of self-aligning roller bearings, the cage, together with the rollers, is swung out of the outer ring.

Other features and advantages of the present invention will become apparent from the following description of the invention which refers to the accompanying drawings.

DESCRIPTION OF EMBODIMENTS OF THE INVENTION

Figure 1:
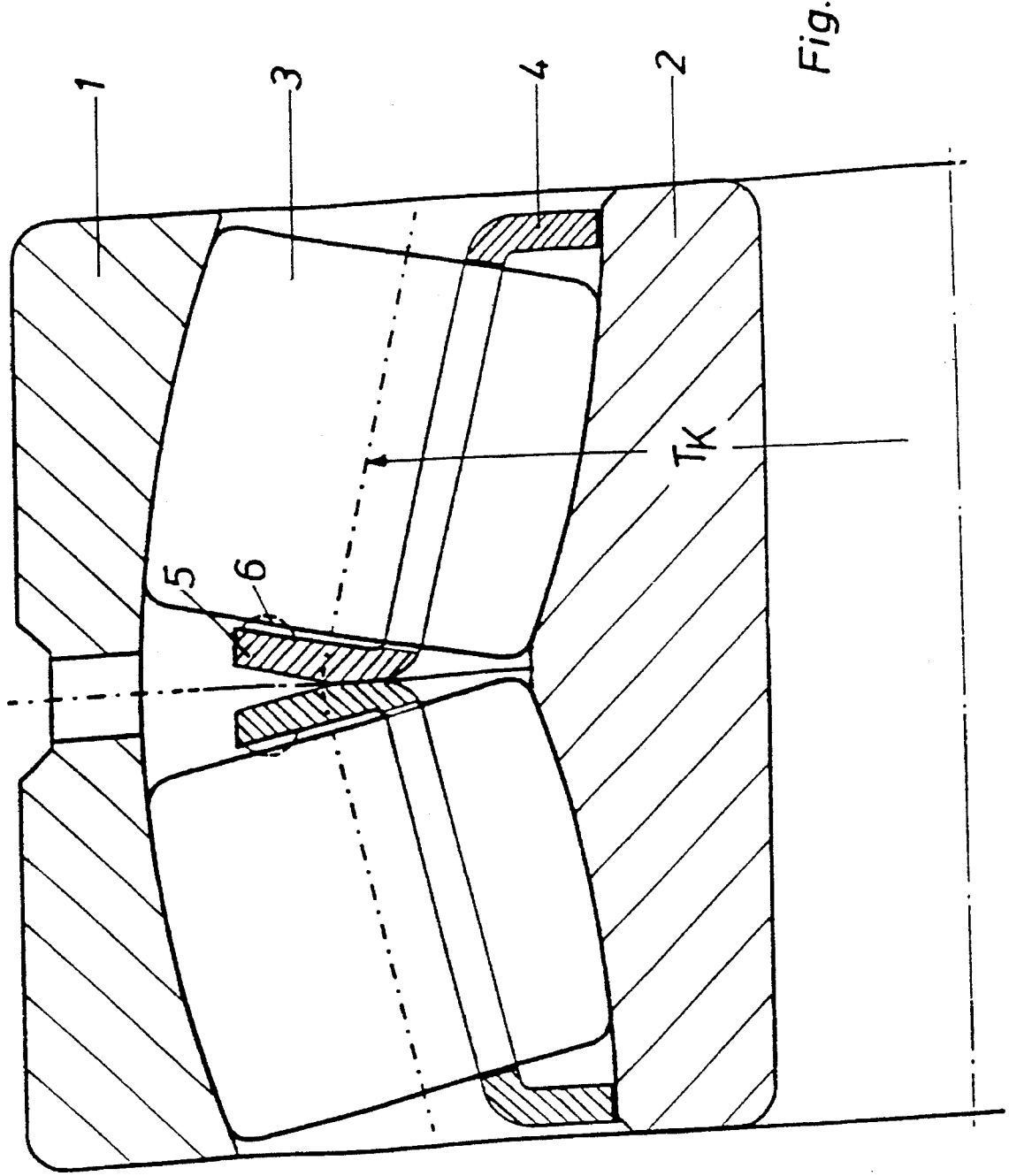
FIG. 1 shows a partial cross section of a roller bearing having a cage in accordance with the invention.

In FIG. 1, a bearing has an outer ring 1 and an inner ring 2. The rollers 3 between the rings are held apart around the rings and are guided in their positions and motion by a cage 4. In the double-row self-aligning roller bearing shown, each row of rollers is provided with a respective cage 4. The cage pockets are arranged radially inside the roller pitch circle, i.e. a circle through the centers of the rollers. Each cage 4 includes at one axial end of the rollers an annular cage flange 5 which extends radially outwardly toward the outer ring 6. The flange is provided with respective axially outwardly projecting holding knobs 6 that project toward the roller held in the cage pocket. The holding knobs 6 are arranged radially outside the pitch circle. The knobs secure the rollers 3 against falling out when the cage for the set of rollers is swung out of the outer ring 1. Nevertheless, the rollers 3 can easily be snapped into the pockets, since the holding knobs on the flange of the cage can spring back resiliently because the knobs and/or the flange supporting them are of a resilient cage material.

During bearing operating condition, on the other hand, the rollers 3 are not contacted by the holding knobs, so that their holding function is retained even after lengthy use of the bearing.

The holding knobs 6 may be produced by deformation of the cage flange by stamping. The stamping can be effected individually or simultaneously in one operation for all holding knobs 6. The centering of the cage in this connection is effected via the diameter of the cage arms.

Figure 2:
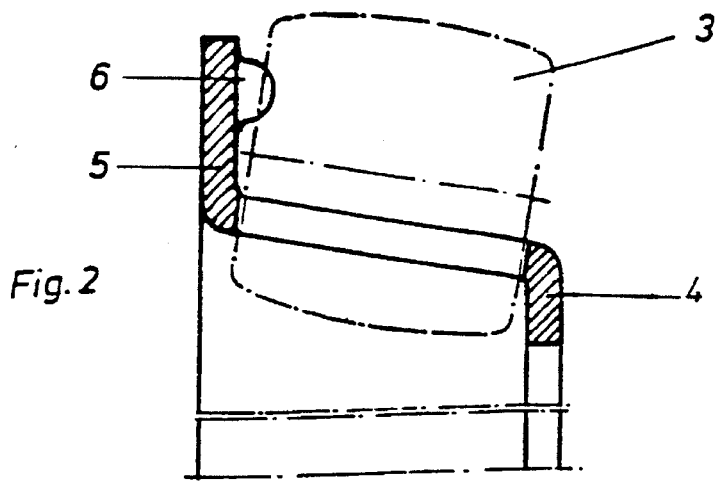
FIG. 2 shows a front view in cross section of a portion of a cage for a set of rollers, which cage has the holding knobs in accordance with the invention.
Figure 3:
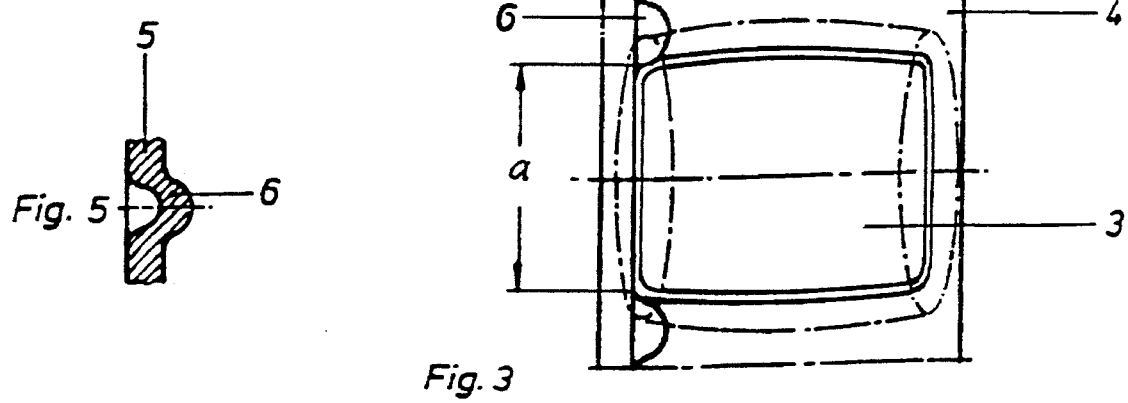
FIG. 3 shows a top view of a portion of a cage for a set of rollers, which has holding knobs according to the invention.
Figure 4:
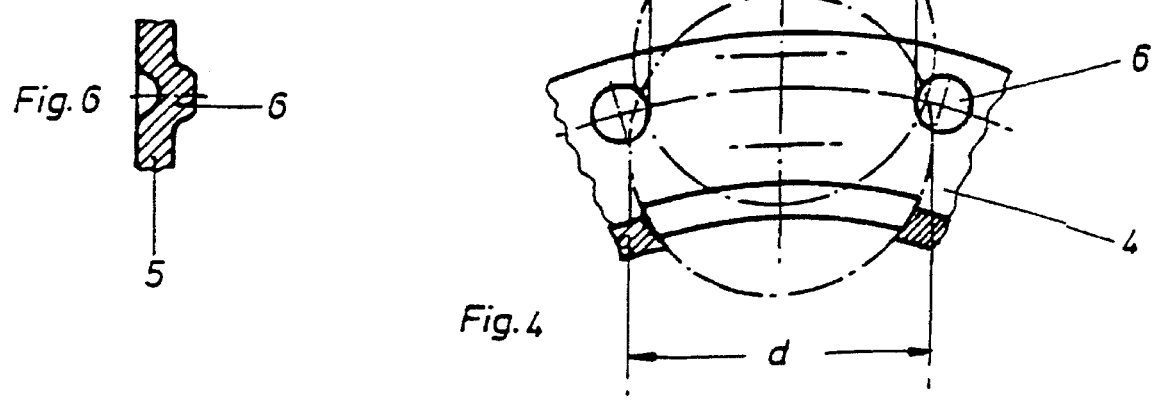
FIG. 4 shows a side and internal view of a portion of a cage for a set of rollers, which has holding knobs according to the invention.

As can be noted from FIGS. 2, 3, and 4, the holding knobs 6 extend in the axial direction towards the respective end of the rollers. The knobs are space circumferentially apart at a distance a which is smaller than the diameter d of the rolls so that the knobs fall outside the circular shape of the respective roller. Because the knobs are also outside the pitch circle of the rollers and beyond the diameter position measured around the pitch circle, the rollers 3 are prevented radially from falling out of the cage pocket. Upon the introduction of the rollers 3 into the cage pocket, the holding knobs 6 move resiliently back into the locking position together with the cage flange 5, so that the rollers 3 can be easily snapped into position.

Figure 5:
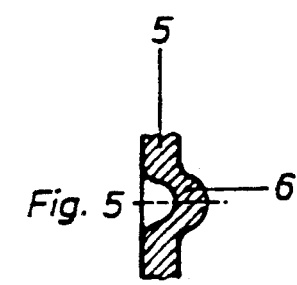
FIG. 5 shows a portion of a hemispherically developed holding knob.
Figure 6:
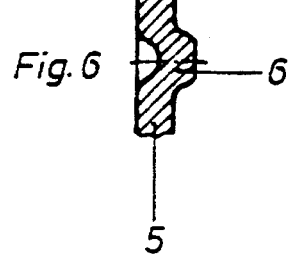
FIG. 6 shows a portion of a frustoconically developed holding knob.

As shown in FIGS. 5 and 6, the holding knobs 6 can be developed in the shape of a hemisphere or a conical frustum, or the like.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roller-bearing cage for holding rollers in the cage when an outer ring of a roller-bearing is removed off the cage, the roller-bearing cage comprising:

a radially outwardly extending cage portion disposed at an axial end of the rolling elements of the bearing;

a plurality of holding knobs formed on the radially outwardly extending portion at respective locations outside the pitch circle of the rollers of the bearing and the knobs extending in the direction toward the ends of the roller, the knobs being spaced apart a distance great enough that a roller may be disposed between two of the knobs, and the distance between the knobs being less than the diameter of the roller lying between the knobs, whereby the knobs retain the roller in the cage with the outer ring of the bearing removed.

2. The cage of claim 1, wherein the radially outwardly extending cage portion comprises a flange projecting radially outwardly and the knobs are formed on the flange.

3. The roller-bearing cage of claim 2, wherein the knobs are stamped on the flange.

4. The cage of claim 2, wherein the flange is annular.

5. The cage of claim 2, wherein the flange is a resilient flange which moves resiliently to enable snapping of the rollers into place in the cage and snapping back of the knobs upon removal of the rollers from and upon installation of the rollers in the cage.

6. The cage of claim 2, wherein the knobs are developed frustoconical in shape.

7. The cage of claim 2, wherein the knobs are developed hemispherical in shape.

8. The cage of claim 1, wherein the holding knobs are positioned to be out of contact with the rollers in the normal operating condition of the bearing with outer and inner rings of the bearing in engagement with the rollers.

9. A roller-bearing including a radially inner ring, a radially outer ring, a row of bearing rollers movably disposed between the rings and a roller bearing cage according to claim 1; the cage defining pockets for the rollers and the cage and rollers being disposed between the outer and inner rings;

the cage further including a radially inwardly extending portion extending toward the inner ring and the radially inwardly extending portion being on the opposite end of the cage from the radially outwardly extending portion thereof.

* * * * *